United States Patent
Kutach, III et al.

(10) Patent No.: US 6,330,784 B1
(45) Date of Patent: Dec. 18, 2001

(54) RAKE ASSEMBLY

(76) Inventors: Steve V. Kutach, III, 503 Fulton Ave., Rockport, TX (US) 78382; Steve V. Kutach, Jr., P.O. Box 94, Rock Island, TX (US) 77470

( * ) Notice: Subject to any disclaimer, the term of this patent is extended or adjusted under 35 U.S.C. 154(b) by 0 days.

(21) Appl. No.: 09/497,929

(22) Filed: Feb. 4, 2000

(51) Int. Cl.$^7$ ................................................ A01D 76/00
(52) U.S. Cl. ............................................. 56/375; 172/643
(58) Field of Search .............................. 56/341, 344, 365, 56/396, 397, 375, 385; 172/44, 189, 612, 642, 643, 705, 707

(56) References Cited

U.S. PATENT DOCUMENTS

| | | | |
|---|---|---|---|
| 2,884,081 | * 4/1959 | Weber | 172/643 X |
| 3,896,883 | * 7/1975 | Howes | 172/707 |
| 4,050,524 | * 9/1977 | Hake | 172/707 |
| 4,393,090 | 7/1983 | Coroneos . | |
| 4,396,817 | 8/1983 | Eck et al. . | |
| 4,520,877 | * 6/1985 | Magelky | 172/643 |
| 4,693,900 | 9/1987 | Molinari . | |
| 4,874,396 | 10/1989 | Mc Leod . | |
| 4,991,661 | * 2/1991 | Barenthsen | 172/662 |
| 5,204,135 | 4/1993 | Huang et al. . | |
| 5,258,198 | 11/1993 | Bastian et al. . | |
| 5,260,083 | 11/1993 | Brian et al. . | |
| 5,356,648 | 10/1994 | Kortschot . | |
| 5,566,767 | * 10/1996 | Dubreuil et al. | 172/708 |
| 5,794,714 | * 8/1998 | Brown | 172/799.5 |

* cited by examiner

Primary Examiner—Robert E. Pezzuto

(57) ABSTRACT

A rake assembly for attachment to a tractor includes a mounting assembly for mounting to a tractor and an arm having a first end, a second end and a middle portion. The arm is fixedly coupled to the mounting assembly. A securing mechanism secures the arm to the tractor. A plurality of fingers for raking the ground surface is each mountable to the arm. Each of the fingers has an elongate member having a first end, a second end and a middle portion. The elongate member has a bore therein, which is generally adjacent to the first end of the elongate member. The middle portion of the elongate member has a curve therein such that a length of the elongate member forms a loop for wrapping about the arm. A bracket secures the elongate member to the arm. A head portion for contacting the ground surface has a first end and a second end. The head portion is generally hollow, and the first end is open. The second end of the elongate member is fixedly inserted in the first end of the head portion.

11 Claims, 3 Drawing Sheets

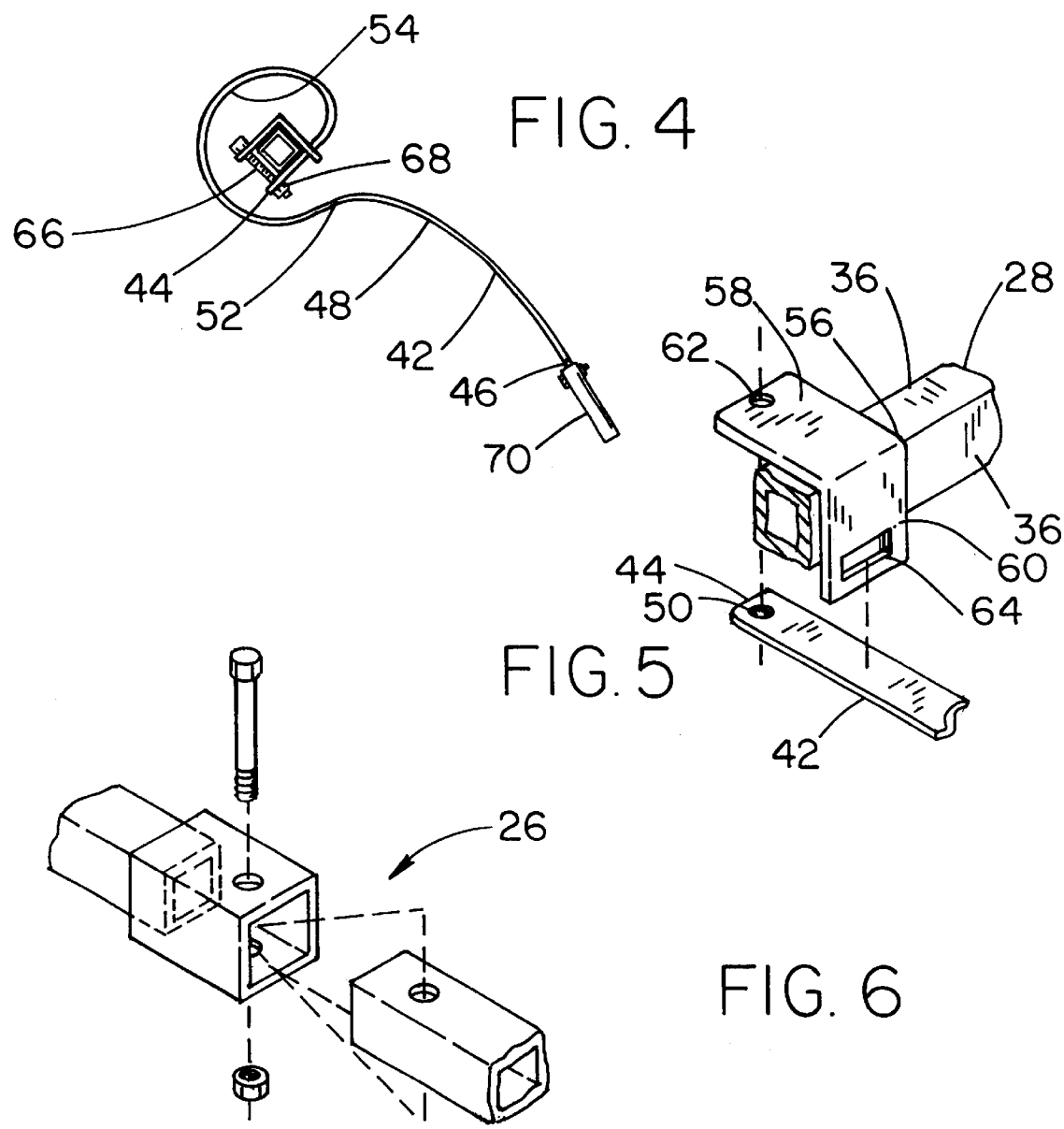

RAKE ASSEMBLY

BACKGROUND OF THE INVENTION

1. Field of the Invention

The present invention relates to rakes and more particularly pertains to a new rake assembly for attachment to a tractor.

2. Description of the Prior Art

The use of rakes is known in the prior art. More specifically, rakes heretofore divised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,833,011; U.S. Pat. No. 3,190,367; U.S. Pat. No. 3,613,802; U.S. Pat. No. 1,525,580; U.S. Pat. No. 3,935,696; and U.S. Des. Pat. No. 298,138.

While these devices fulfill their respective, particular objectives and requirements, the aforementioned patents do not disclose a new rake assembly. The inventive device includes a mounting assembly for mounting to a tractor. An arm has a first end, a second end and a middle portion. The arm is fixedly coupled to the mounting assembly. A plurality of securing means secures the arm to the tractor. A plurality of fingers for raking the ground surface is each mountable to the arm. Each of the fingers has an elongate member having a first end, a second end and a middle portion. The elongate member has a bore therein, which is generally adjacent to the first end of the elongate member. The middle portion of the elongate member has a curve therein such that a length of the elongate member forms a loop for wrapping about the arm. A bracket secures the elongate member to the arm. A head portion for contacting the ground surface has a first end and a second end. The head portion is generally hollow, and the first end is open. The second end of the elongate member is fixedly inserted in the first end of the head portion.

In these respects, the rake assembly according to the present invention substantially departs from the conventional concepts and designs of the prior art, and in so doing provides an apparatus primarily developed for the purpose of attachment to a tractor.

SUMMARY OF THE INVENTION

In view of the foregoing disadvantages inherent in the known types of rakes now present in the prior art, the present invention provides a new rake assembly construction wherein the same can be utilized for attachment to a tractor.

The general purpose of the present invention, which will be described subsequently in greater detail, is to provide a new rake assembly apparatus and method which has many of the advantages of the rakes mentioned heretofore and many novel features that result in a new rake assembly which is not anticipated, rendered obvious, suggested, or even implied by any of the prior art rakes, either alone or in any combination thereof.

To attain this, the present invention generally comprises a mounting assembly for mounting to a tractor. An arm has a first end, a second end and a middle portion. The arm is fixedly coupled to the mounting assembly. A plurality of securing means secures the arm to the tractor. A plurality of fingers for raking the ground surface is each mountable to the arm. Each of the fingers has an elongate member having a first end, a second end and a middle portion. The elongate member has a bore therein, which is generally adjacent to the first end of the elongate member. The middle portion of the elongate member has a curve therein such that a length of the elongate member forms a loop for wrapping about the arm. A bracket secures the elongate member to the arm. A head portion for contacting the ground surface has a first end and a second end. The head portion is generally hollow, and the first end is open. The second end of the elongate member is fixedly inserted in the first end of the head portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing, of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rake assembly apparatus and method which has many of the advantages of the rakes mentioned heretofore and many novel features that result in a new rake assembly which is not anticipated. rendered obvious, suggested, or even implied by any of the prior art rakes, either alone or in any combination thereof.

It is another object of the present invention to provide a new rake assembly which may be easily and efficiently manufactured and marketed.

It is a further object of the present invention to provide a new rake assembly which is of a durable and reliable construction.

An even further object of the present invention is to provide a new rake assembly which is susceptible of a low cost of manufacture with regard to both materials and labor, and which accordingly is then susceptible of low prices of sale to the consuming public, thereby making such rake assembly economically available to the buying public.

Still yet another object of the present invention is to provide a new rake assembly which provides in the apparatuses and methods of the prior art some of the advantages thereof, while simultaneously overcoming some of the disadvantages normally associated therewith.

Still another object of the present invention is to provide a new rake assembly for attachment to a tractor.

Yet another object of the present invention is to provide a new rake assembly which includes a mounting assembly for mounting to a tractor. An arm has a first end, a second end and a middle portion. The arm is fixedly coupled to the mounting assembly. A plurality of securing means secures the arm to the tractor. A plurality of fingers for raking the ground surface is each mountable to the arm. Each of the fingers has an elongate member having a first end, a second end and a middle portion. The elongate member has a bore therein, which is generally adjacent to the first end of the elongate member. The middle portion of the elongate member has a curve therein such that a length of the elongate member forms a loop for wrapping about the arm. A bracket secures the elongate member to the arm. A head portion for contacting the ground surface has a first end and a second end. The head portion is generally hollow, and the first end is open. The second end of the elongate member is fixedly inserted in the first end of the head portion.

Still yet another object of the present invention is to provide a new rake assembly that rakes up large amounts of debris and large limbs and branches.

Even still another object of the present invention is to provide a new rake assembly that has elongate members which are directed away from the tractor such that the elongate members do not dig up earth during the process of raking.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic side view of the present invention.

FIG. 5 is a schematic perspective view of the bracket of the present invention.

FIG. 6 is a schematic perspective view of a hitch of the present invention.

DESCRIPTION OF THE PREFERRED EMBODIMENT

Figure 1:
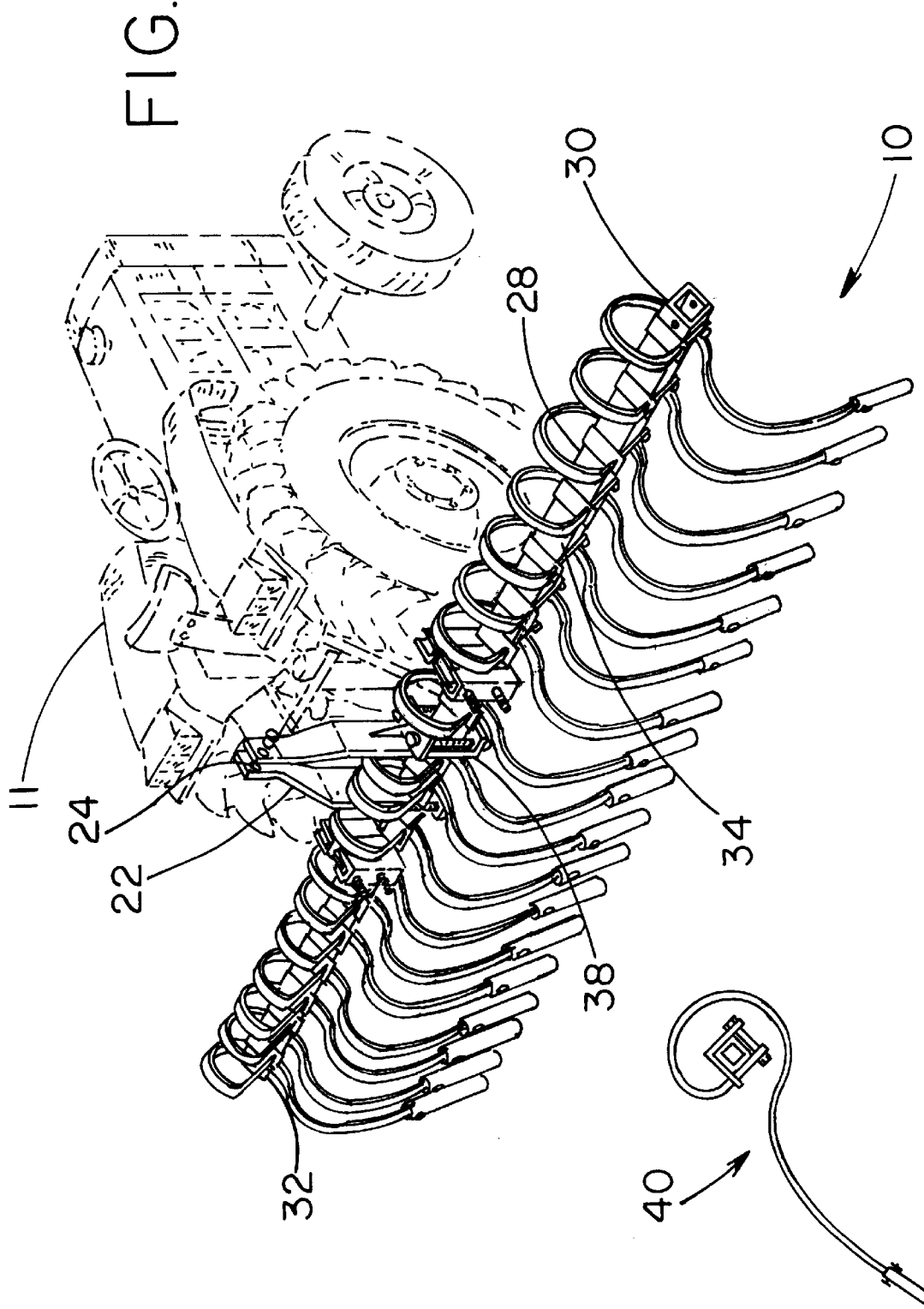
FIG. 1 is a schematic perspective view of a new rake assembly according to the present invention.
Figure 2:
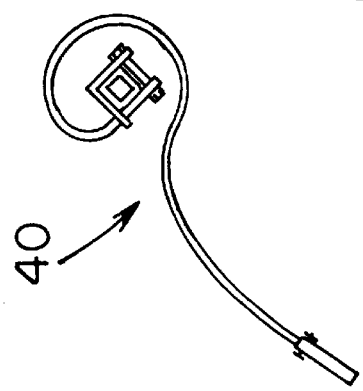
FIG. 2 is a schematic side view of a finger of the present intention.
Figure 3:
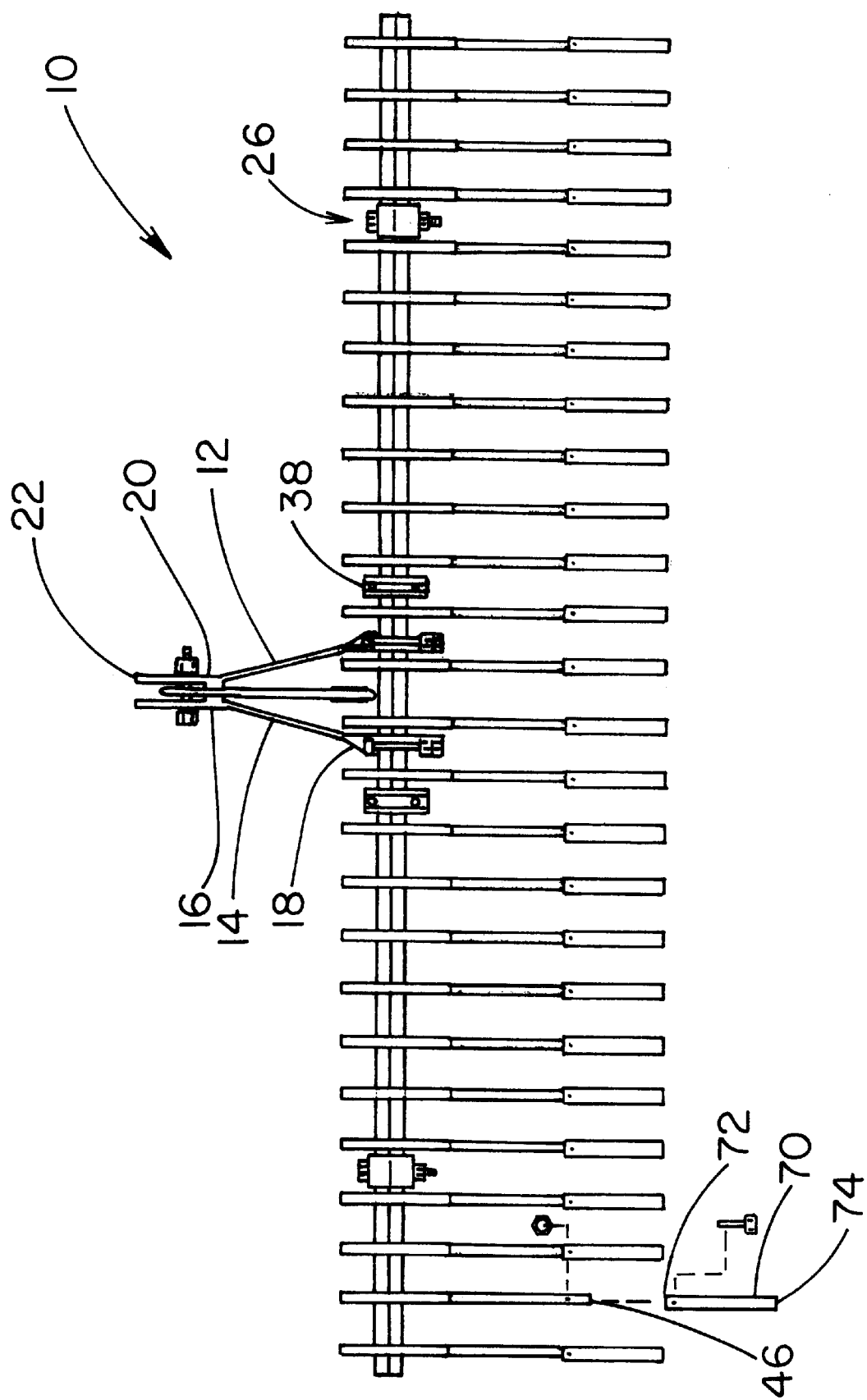
FIG. 3 is a schematic back view of the present invention.

With reference now to the drawings, and in particular to FIGS. 1 through 6 thereof, a new rake assembly embodying the principles and concepts of the present invention and generally designated by the reference numeral 10 will be described.

As best illustrated in FIGS. 1 through 6, the rake assembly 10 generally comprises a mounting assembly 12 for mounting to a tractor 11. The mounting assembly 12 comprises a pair of bars 14. Each of the bars is elongate and has a first end 16 and a second end 18. The first ends 16 of the bars 14 are fixedly coupled together. The bars form an inverted V-shape, and a juncture of the first ends of the bars defines a top edge 20. Two upstanding members 22 extend upwardly from the top edge 20 and the upstanding members 22 are integrally coupled to the top edge 20. The upstanding members 22 are spaced. The upstanding members 22 each have a bore 24 therethrough, which are generally coaxial. The mounting assembly 12 also has a hitch 26 coupled thereto for attachment to the tractor 11.

An arm 28 has a first end 30, a second end 32 and a middle portion 34. The middle portion 34 of the arm 28 is fixedly coupled to the second ends 18 of the bars 14 of the mounting assembly 12. The arm 28 has a generally rectangular cross-section taken transverse to a longitudinal axis of the arm. The arm 28 has four faces 36 generally orientated at an acute angle to a ground surface. The acute angles are preferably equal to approximately forty-five degrees.

A plurality of securing means 38 secures the arm 28 to the tractor 11. Each of the securing means 38 is coupled to the arm 28. Each of the securing means 38 is a bracket adapted to couple to the tractor 11 and the mounting assembly 12.

A plurality of fingers 40 rakes the ground surface. Each of the fingers 40 is an elongate member 42. The elongate member 42 has a first end 44, a second end 46 and a middle portion 48. The elongate member 42 has a bore 50 therein. The bore 50 is generally adjacent to the first end 44 of the elongate member 42. The middle portion 48 of the elongate member 42 has a curve 52 therein such that a length of the elongate member 42 forms a loop. The curve 52 is nearer the first end 44 than the second end 46. The first end 44 of the elongate member 42 is directed toward the middle portion 48, and the second end 46 of the elongate member 42 extends away from the bore 50 along a line orientated generally parallel to a radial axis of the bore 50. The curve 52 has an inside portion 54.

A bracket 56 secures the elongate member 42 to the arm 28. The bracket 56 is generally L-shaped and has a first leg 58 and a second leg 60. Each of the first 58 and second legs 60 has a free edge. The first leg 58 has a bore 62 therein. The bore 62 is generally adjacent to the free edge, and the second leg 60 has a slot 64 therein for receiving the elongate member 42. The slot 64 is generally adjacent to the free edge of the second leg 60.

A fastening means 66 fastens the bracket 56 to the elongate member 42. The fastening means 66 extends through the bore 50 in the elongate member and the bore 62 in the bracket 56. The fastening means is a bolt which is secured by a nut 68.

A head portion 70 contacts the ground surface. The head portion has a first end 72 and a second end 74. The head portion 70 is generally hollow, and the first end 72 is open. The second end 74 has a rounded exterior surface. The second end 46 of the elongate member 42 is fixedly inserted in the first end 72 of the head portion 70.

In use, a portion of the elongate member 42, generally adjacent to the first end, is abutted against a face 36 of the arm 28. The bracket 56 is abutted against the arm 28 such that the first end 44 of the elongate member 42 is inserted through the slot 64 and the bore 62 in the bracket 56 is coaxially aligned with the bore 50 in the elongate member 42. The second end 46 of the elongate member 42 is directed away from the tractor 11 and toward the ground surface so that the ground can be raked when the arm 28 is lowered to cause the head portions 70 to touch the ground. A plurality of fingers 40 is used in conjunction with each other to form the rake.

As to a further discussion of the manner of usage and operation of the present invention, the same should be apparent from the above description. Accordingly, no further discussion relating to the manner of usage and operation will be provided With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A rake assembly, said assembly being mountable to a tractor, said assembly comprising:
   a mounting assembly for mounting to a tractor;
   an arm having a first end, a second end and a middle portion, said arm being fixedly coupled to said mounting assembly;
   securing means for securing said arm to the tractor;
   a plurality of fingers for raking the ground surface, each of said fingers being mountable to said arm, each of said fingers comprising:
      an elongate member having a first end, a second end and a middle portion, said middle portion of said elongate member having a curve therein such that a length of said elongate member forms a loop that loops about the first end so that said middle portion loops about said arm when said fingers are mounted on said arm;
      a bracket for securing said elongate member to said arm; and
      a head portion mounted on said second end of said elongate member for contacting the ground surface.

2. The rake assembly as in claim 1, wherein said mounting assembly comprises:
   said mounting assembly comprising a pair of bars, each of said bars being elongate and having a first end and a second end, said first ends of said bars being fixedly coupled together said bars forming an inverted V-shape, a juncture of said first ends of said bars defining a top edge, two upstanding members extend upwardly from said top edge and said upstanding members are integrally coupled to said top edge, said upstanding members being spaced, said upstanding members each having a bore therethrough, said bores being generally coaxial; and
   said middle portion of said arm being fixedly coupled to said second ends of said bars of said mounting assembly.

3. The rake assembly as in claim 1, wherein said arm further comprises:
   said arm having a generally rectangular cross-section taken transverse to a longitudinal axis of said arm, said arm having four faces generally orientated at an acute angle to a ground surface said acute angle being generally equal to approximately forty-five degrees.

4. The rake assembly as in claim 3, wherein said elongate member comprises:
   said curve being nearer said first end than said second end, said first end of said elongate member being directed toward said middle portion, said second end of said elongate member extending away from said bore along a line orientated generally parallel to a radial axis of said bore, said curve having an inside portion.

5. The rake assembly as in claim 4, further comprising:
   said bracket for securing said elongate member to said arm being generally L-shaped, said bracket having a first leg and a second leg, each of said first and second legs having a free edge, said first leg having a bore therein, said bore being generally adjacent to said free edge, said second leg having a slot therein for receiving said elongate member, said slot being generally adjacent to said free edge of said second leg; and
   a fastening means for fastening said bracket to said elongate member, said fastening means extending through said bore in said elongate member and said bore in said bracket, said fastening means being a bolt.

6. A rake assembly, said assembly being mountable to a tractor, said assembly comprising:
   a mounting assembly for mounting to a tractor comprising a pair of bars, each of said bars being elongate and having a first end and a second end, said first ends of said bars being fixedly coupled together, said bars forming an inverted V-shape, a juncture of said first ends of said bars defining a top edge, two upstanding members extend upwardly from said top edge and said upstanding members are integrally coupled to said top edge, said upstanding members being spaced, said upstanding members each having a bore therethrough, said bores being generally coaxial;
   an arm having a first end, a second end and a middle portion, said middle portion of said arm being fixedly coupled to said second ends of said bars of said mounting assembly, said arm having a generally rectangular cross-section taken transverse to a longitudinal axis of said arm, said arm having four faces generally orientated at an acute angle to a ground surface, said acute angle being generally equal to approximately forty-five degrees;
   securing means for securing said arm to the tractor being coupled to said arm, each of said securing means being a bracket adapted to couple to the tractor;
   a plurality of fingers for raking the ground surface, each of said fingers comprising:
      an elongate member, said elongate member having a first end, a second end and a middle portion, said elongate member having a bore therein, said bore being generally adjacent to said first end of said elongate member, said middle portion of said elongate member having a curve therein such that a length of said elongate member forms a loop that loops about the first end so that said middle portion loops about said arm when said fingers are mounted on said arm, said curve being nearer said first end than said second end, said first end of said elongate member being directed toward said middle portion, said second end of said elongate member extending away from said bore along a line orientated generally parallel to a radial axis of said bore, said curve having an inside portion;

a bracket for securing said elongate member to said arm, said bracket being generally L-shaped, said bracket having a first leg and a second leg, each of said first and second legs having a free edge, said first leg having a bore therein, said bore being generally adjacent to said free edge, said second leg having a slot therein for receiving said elongate member, said slot being generally adjacent to said free edge of said second leg;

a fastening means for fastening said bracket to said elongate member, said fastening means extending through said bore in said elongate member and said bore in said bracket said fastening means being a bolt;

a head portion mounted on said second end of said elongate member for contacting the ground surface, said head portion having a first end and a second end, said head portion being generally hollow, said first end being open, said second end having a rounded exterior surface, said second end of said elongate member being fixedly inserted in said first end of said head portion;

wherein a portion of said elongate member is generally adjacent to said first end is abutted against an edge of said arm, wherein said bracket is abutted against said arm such that said first end of said elongate member is inserted through said slot and said bore in said bracket is coaxially aligned with said bore in said elongate member, wherein said second end of said elongate member is directed away from said tractor and toward the ground surface; and wherein a plurality of fingers are removably coupled to said arm, each of said fingers being spaced.

7. A rake assembly, said assembly being mountable to a tractor, said assembly comprising:

a mounting assembly for mounting to a tractor;

an arm having a first end, a second end and a middle portion, said arm being fixedly coupled to said mounting assembly;

securing means for securing said arm to the tractor;

a plurality of fingers for raking the ground surface, each of said fingers being mountable to said arm, each of said fingers comprising:

an elongate member having a first end, a second end and a middle portion having a curve therein such that a length of said elongate member forms a loop that loops about the first end for looping said middle portion about said arm when said finger is mounted on said arm;

a bracket for securing said elongate member to said arm; and a head portion mounted on said second end of said elongate member for contacting the ground surface.

8. The rake assembly as in claim 7, wherein said mounting assembly comprises:

said mounting assembly comprising a pair of bars, each of said bars being elongate and having a first end and a second end, said first ends of said bars being fixedly coupled together, said bars forming an inverted V-shape, a juncture of said first ends of said bars defining a top edge, two upstanding members extend upwardly from said top edge and said upstanding members are integrally coupled to said top edge, said upstanding members being spaced, said upstanding members each having a bore therethrough, said bores being generally coaxial; and said middle portion of said arm being fixedly coupled to said second ends of said bars of said mounting assembly.

9. The rake assembly as in claim 7, wherein said arm further comprises:

said arm having a generally rectangular cross-section taken transverse to a longitudinal axis of said arm, said arm having four faces generally orientated at an acute angle to a ground surface, said acute angle being generally equal to approximately forty-five degrees.

10. The rake assembly as in claim 9, wherein said elongate member comprises:

said curve being nearer said first end than said second end, said first end of said elongate member being directed toward said middle portion, said second end of said elongate member extending away from said bore along a line orientated generally parallel to a radial axis of said bore, said curve having an inside portion.

11. The rake assembly as in claim 10, further comprising:

said bracket for securing said elongate member to said arm being generally L-shaped, said bracket having a first leg and a second leg, each of said first and second legs having a free edge, said first leg having a bore therein, said bore being generally adjacent to said free edge, said second leg having a slot therein for receiving said elongate member, said slot being generally adjacent to said free edge of said second leg; and a fastening means for fastening said bracket to said elongate member extending through said bore in said elongate member and said bore in said bracket said fastening means being a bolt.

* * * * *